Aug. 10, 1965     N. K. LINDGREN     3,200,275
ELECTRIC MOTOR HOUSINGS
Filed Jan. 19, 1961     2 Sheets-Sheet 1

INVENTOR.
Nils Kaure Lindgren
BY
his ATTORNEY

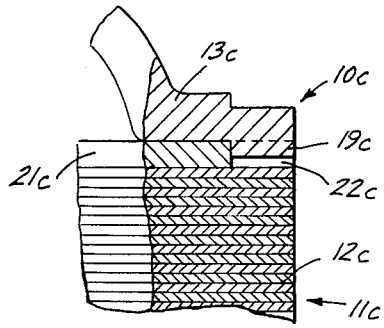
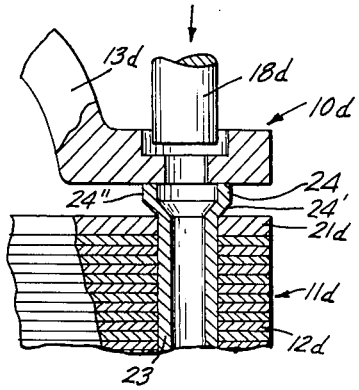
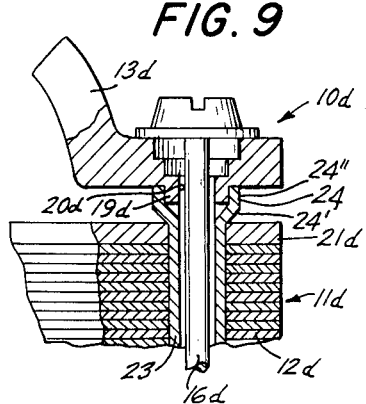
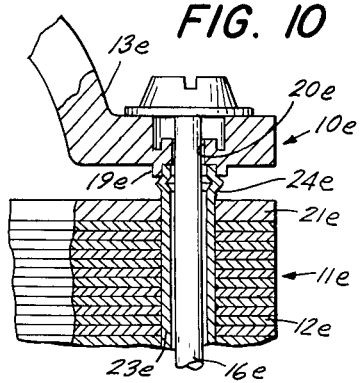
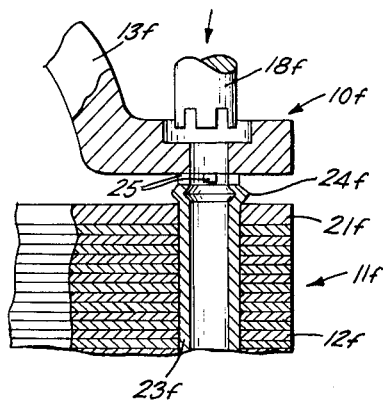
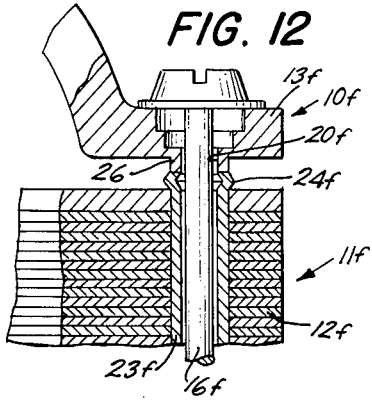

United States Patent Office 3,200,275
Patented Aug. 10, 1965

3,200,275
ELECTRIC MOTOR HOUSINGS
Nils Kauri Lindgren, Stockholm, Sweden, assignor to Aktiebolaget Electrolux, Stockholm, Sweden, a corporation of Sweden
Filed Jan. 19, 1961, Ser. No. 83,814
Claims priority, application Sweden, Jan. 20, 1960, 541/60
2 Claims. (Cl. 310—90)

This invention relates generally to electric motors, and more particularly is directed to improvements in electric motors of the type wherein the stator preferably constitutes the housing of the motor and has structures at its opposite ends carrying the bearings by which the motor shaft is rotatably supported.

In existing electric motors of the described character, the bearing support structures or seats are mounted against the end surfaces of the stack of laminations or plates forming the stator or against projections provided at the edge portions of the latter, and the bearing support structures and laminated stators are held axially together by bolts extending therethrough. However, such existing arrangements for securing the bearing support structures or seats to the laminated stator do not satisfactorily fix the positions of the bearings relative to each other and to the stator, particularly as regards rotational and radial displacement thereof. Further, displacement of the bearing support structures or seats relative to each other and the stator may be caused by dimensional changes occurring in the laminated stator, for example, as a result of heating of the latter.

Accordingly, it is an object of this invention to provide improved means by which the bearing support structures or seats are securely fixed relative to the laminated stator in an electric motor of the described character.

Another object is to provide a simpler and less expensive construction for electric motors of the described character.

In accordance with an aspect of the invention, the bearing support structures or seats at the opposite ends of the laminated stator are fixedly secured against rotation and radial displacement relative to the stator by cooperatively engaging projections and recesses defined by portions of the bearing support structures or seats and by parts of the stator, respectively, or by parts of the stator and portions of the bearing support structures or seats, respectively, with the projections or recesses of the bearing support structures being defined by portions of the later which are molded, pressed or struck therefrom.

In one form of the invention, recesses opening axially at the ends of the stack of plates forming the laminated stator are engaged by projections which are molded, pressed or struck from the bearing support structures or seats.

In another form of the invention, the laminations or plates forming the stator are held together by tubular spacers extending closely through axially aligned openings provided in the plates, and the opposite ends of the tubular spacers project beyond the ends of the stator and cooperatively engage either projections or recesses which are defined by portions molded, pressed or struck from the material of the bearing support structures or seats. In this form of the invention, the ends of the tubular spacers projecting beyond the ends of the laminated stator are preferably diametrically expanded so that such tubular spacers constitute hollow rivets for securing together the laminations or plates of the stator.

The above, and other objects, features and advantages of the invention, will be apparent in the following detailed description of illustrative embodiments thereof which is to be read in connection with the accompanying drawings, forming a part hereof, and wherein:

FIG. 1 as an elevational view of an electric motor embodying the present invention, and which is shown partly broken away and in section;

FIG. 7 is a view similar to that of FIG. 3, but showing still another embodiment of the invention;

FIG. 8 is a view similar to that of FIG. 2, but illustrating an intermediate stage in the manufacture of an electric motor in accordance with still another embodiment of the invention;

FIG. 9 is a view similar to that of FIG. 4, but showing the final configuration of the electric motor manufactured in accordance with the embodiment of the invention illustrated in FIG. 8;

FIG. 10 is a view similar to that of FIG. 9 but showing a modification of the construction illustrated therein;

FIG. 11 is a view similar to that of FIG. 8, but illustrating an intermediate stage in the manufacture of an electric motor in accordance with still another embodiment of the invention; and FIG. 12 is a view similar to that of FIG. 9, but illustrating the completed condition of the electric motor constructed in accordance with the embodiment of FIG. 11.

Figure 1:
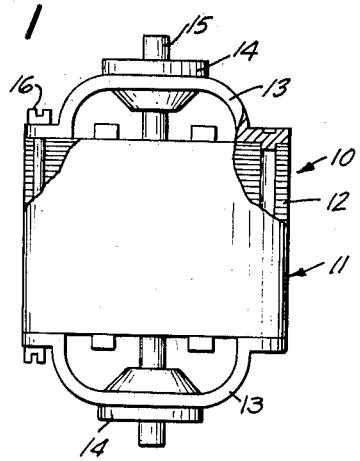

Referring to the drawings in detail, and initially to FIG. 1 thereof, it will be seen that an electric motor 10 of the kind to which the invention relates generally includes a stator 11 formed by a stack or pack of annular laminations or plates 12 which define the motor housing, and bearing support structures or seats 13 secured at the opposite ends of stator 11 and carrying bearings 14 in which the motor shaft 15 is rotatably mounted. The bearing support structures or seats 13 are held axially against the ends of stator 11 by bolts 16 which extend axially through plates 12 of stator 11 and bearing support structures 13.

Figure 2:
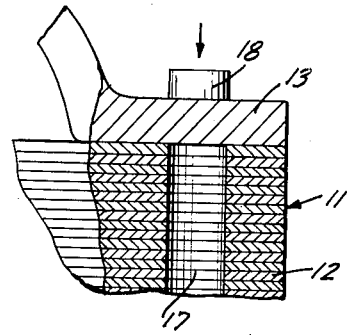
FIG. 2 is an enlarged fragmentary sectional view illustrating a portion of the structure of the motor of FIG. 1 at an intermediate stage in the manufacture thereof.

In accordance with the present invention, as illustrated in FIG. 2, the plates 12 of stator 11 are formed with aligned openings defining bores 17, only one of which appears in FIG. 2, extending axially through the stator, and therefore providing axially opening recesses at the opposite ends of the stator. Each of the bearing support structures or seats 13 is placed against the related end of stator 11 and pressed, molded or struck, as by a suitable tool diagrammatically illustrated at 18 (FIG. 2), so that the material of bearing support structure or seat 13 is plastically deformed to provide a projection 19 (FIG. 3) extending axially into the recess or adjacent open end of each bore 17 of stator 11.

It will be apparent that the cooperative engagement of each projection 19 with the related recess defined by the end of a bore 17 of stator 11 securely fixes the bearing support structure or seat 13 against rotation or radial displacement relative to the stator, each projection 19 having a convex surface cooperating with a different one of the recesses having a coacting concave surface facing radially outward from the axis of the motor shaft 15.

Figure 4:
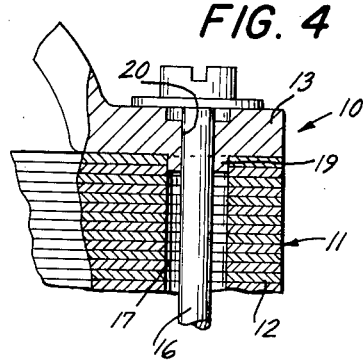
FIG. 4 is a view similar to that of FIG. 3, but illustrating another embodiment of the invention.

As shown in FIG. 4, the bores 17 formed by the holes provided in plates 12 of stator 11 to define the recesses opening axially at the opposite ends of the latter, and which are primarily intended for receiving the projections 19 pressed, molded or struck from the material of the bearing support structures 13, may also receive the bolts 16, in which case, the bearing support structures or seats 13 have holes 20 drilled therein, either before or after the formation of the projections 19, with the holes 20 being in alignment with the bores 17 to receive the bolts 16 passing through the latter. Thus, the bolts 16 may be drawn up or tightened to axially secure the bearing support structures or seats 13 to the stator 11 and also to compact or compress the laminations or plates 12 of the stator.

Figure 5:
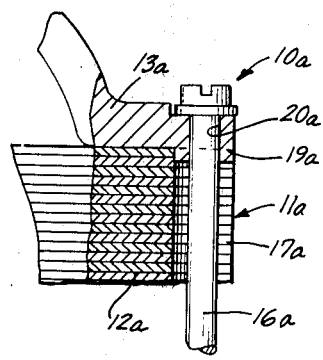
FIG. 5 is a view similar to that of FIG. 3, but showing still another embodiment of the invention.

In FIGS. 1 to 4, inclusive the bores 17 defining the recesses opening axially at the opposite ends of stator 11 to receive the projections 19 pressed, molded or struck from the material of bearing support structures or seats 13 are formed by holes which are located intermediate the inner and outer peripheries of the annular plates or laminations 12 of the stator. However, as shown in FIG. 5, an electric motor 10a embodying the present invention may have the annular plates or laminations 12a of its stator 11a provided with aligned notches or cutouts in the outer peripheries thereof to form axially extending grooves or troughs 17a having concave surfaces facing radially outward from the axis of the motor shaft 15 at the outer surface of the stator and defining recesses opening axially at the opposite ends of the stator. In accordance with the invention, such recesses receive projections 19a which are molded, pressed or struck from the material of the bearing support structures or seats 13a so that the cooperative engagement of the projections 19a with the recesses defined by the ends of the grooves or troughs 17a fixedly secures the bearing support structures or seats 13a against rotation and radial displacement relative to stator 11a. Further, as is apparent in FIG. 5, the bearing support structures or seats 13a may be formed with holes 20a aligned with the grooves or trough 17a to receive bolts 16a extending through the latter, and by which the bearing support structures are held axially against the opposite ends of the stator.

Figure 3:
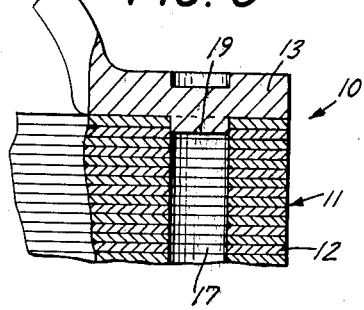
FIG. 3 is a view similar to that of FIG. 2, but showing the illustrated structure at a later stage in the manufacture of the motor.
Figure 6:
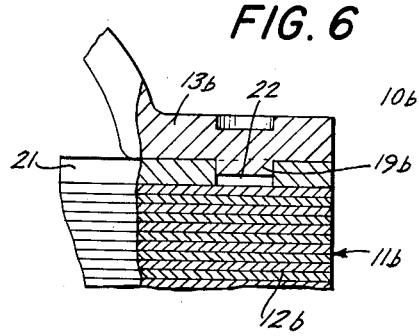
FIG. 6 is a view similar to that of FIG. 3, but showing still another embodiment of the invention.

Although the bearing support structures or seats bear directly against the opposite ends of the stack of laminations or plates forming the stator in the embodiments illustrated in FIGS. 3, 4 and 5, and have their molded, pressed or struck projections 19 or 19a engaged in recesses defined by the opposite ends of bores 17 or grooves 17a extending axially throughout the stack of laminations or plates, it is to be noted that such molded, pressed or struck projections may be engaged in recesses that are formed only at the opposite ends of the stator structure. Thus, as shown in FIG. 6, the stator 11b of an electric motor 10b has the usual stack of annular laminations or plates 12b and relatively thicker end plates 21 disposed at the opposite ends of such stack, and the projections 19b which are molded, pressed or struck from the bearing support structures or seats 13b engage in recesses or openings 22 formed only in the end plates 21. In the arrangement of FIG. 6, the end plates 21 and annular laminations or plates 12b of stator 11b and the bearing support structures or seats 13b may be held axially together by bolts (not shown) extending through aligned holes in plates 12b and 21 and in seats 13b at locations that are spaced circumferentially from the locations of projections 19b and the cooperating recesses 22. Thus, such bolts, which are similar to the bolts 16 and 16a of FIGS. 4 and 5, axially secure together the stator and bearing support structures, while the cooperative engagement of the projections 19b with the recesses 22 fixedly secure the bearing support structures 13b against rotation and radial displacement relative to the stator 11b, each projection 19b having a convex surface cooperating with a different one of the recesses 22 having a coacting concave surface facing radially outward from the axis of the motor shaft 15.

The recesses 22 and the cooperating projections 19b may be spaced radially inward from the outer peripheries of the end plates 21 and bearing support structures 13b, as in FIG. 6, or the end plates 21c of the stator 11c may be formed with recess defining cutouts 22c in the outer peripheries thereof to receive similarly located projections 19c which are molded, pressed or struck from the bearing support structures 13c, as in FIG. 7.

In the previously described embodiments of the invention, the bearing support structures or seats have abutted either directly against the ends of the stack of laminations or plates forming the stator, as in FIGS. 4 and 5, or against the end plates disposed at the opposite ends of such stack, as in FIGS. 6 and 7. However, since the distance between the ends of the stator may change, for example, as a result of deposits between the laminations or plates of the stack upon heating of the stator, it is possible for the bearing support structures or seats to be displaced relative to each other, thereby altering the locations of the bearings in which the motor shaft is mounted. In order to avoid this possibility, an electric motor 10d (FIGS. 8 and 9) embodying the present invention may have tubular spacers 23 extending axially through aligned openings in the laminations 12d and plates 21d of its stator 11d, with the opposite ends of spacers 23 extending beyond the end plates 21d and being diametrically enlarged, as at 24, so that the tubular spacers 23 act as hollow rivets for securing together the laminations 12d and plates 21d. Further, the diametrically enlarged end portions 24 of the tubular spacers 23 define axially opening recesses into which projections 19d (FIG. 9) may be molded, pressed or struck from the material of the bearing support structures or seats 13d, for example, by the action of a tool diagrammatically indicated at 18d in FIG. 8.

The bearing support structures or seats 13d may also be formed with openings 20d either before or after the projections 19d are molded, pressed or struck therefrom, and such openings 20d are aligned with the tubular spacers 23 so that bolts 16d can extend axially through the tubular spacers 23 and the openings 20d for axially securing the bearing support structures against the ends of the tubular spacers. It will be apparent that, as in the previously described embodiments, the projections 19d engaging in the recesses defined by the ends 24 of spacers 23 prevent rotation and radial displacements of the bearing support structures or seats 13d relative to the stator 11d, each projection 19d having a convex surface cooperating with a different one of the recesses having a coacting concave surface facing radially outward from the axis of the motor shaft 15. Further, since the bearing support structures or seats 13d bear against the ends 24 of spacers 23, the latter positively establish or fix the axial distance between the bearing support structures at the opposite ends of the stator, and such distance is not influenced by any dimensional changes in the stack of laminations or plates 12d forming the stator.

The ends 24 of the tubular spacers 23 may be referred to as axially extending end zones which project beyond the end walls of the stator body 11d. The end zones 24 include first and second axially extending sections 24′ and 24″. The first end zone sections 24′ of the tubular spacers 23 have walls which flare outward from a first internal diameter adjacent to the end walls of the stator body 11d to a second larger internal diameter at regions axially removed from the end walls. The second end zone sections 24″ extend from the last-mentioned regions to the extreme ends of the spacer tubes 23 and have walls substantially parallel to the openings in the stator body 11d through which the spacer tubes extend. Hence, the internal diameters of the second end zone sections 24″ are substantially uniform throughout their lengths and at the second larger internal diameter.

The projections 19d may be referred to as studs which are distributed about the inner wall surfaces of the bearing support members 13d and are integral therewith and extend axially therefrom. The second end zone sections 24″ define cylindrical-shaped recesses which snugly receive the studs 19d, and the end surfaces at the extreme ends of the second end zone sections 24" abut the inner wall surfaces of the bearing support members 13d at regions disposed about the studs 19d.

In all of the previously described embodiments of the invention, rotation and radial displacement of the bearing support structures or seats relative to the stator has been prevented by projections which are molded, pressed or struck from the material of the bearing support structure and which engage in cooperating recesses defined by parts of the stator. However, this arrangement may be reversed, that is, portions of the bearing support structures or seats may be molded, pressed or struck from the material therefrom so as to define recesses which accommodate projections extending from the opposite ends of the stator. For example, as illustrated in FIG. 10, in an electric motor 10e embodying the invention, annular ribs 19e are molded, pressed or struck from the material of each bearing support structure or seat 10e so as to each define a circular recess opening towards the adjacent end of the stator 11e and adapted to receive the projecting end 24e of the tubular spacer 23e by which the plates 12e and 21e of the stator are held axially together. In the electric motor 10e the bearing support structures or seats 13e are once again held axially against the ends of the tubular spacers 23e by means of bolts 16e extending axially through the tubular spacers and through openings 20e formed in the bearing support structures concentrically with the annular ribs 19e which are molded, pressed or struck therefrom. It will be apparent that the cooperative engagement of the ends 24e of the spacers 23e in the recesses defined by the annular ribs 19e fixedly secures the bearing support structures or seats 13e against rotation and radial displacement relative to the stator 11e, each projecting end 24e of one of the spacers 23e having a convex surface cooperating with a different one of the recesses having a coacting concave surface facing radially outward from the axis of the motor shaft 15.

A further modification of the embodiment of FIGS. 8 and 9 is illustrated in FIGS. 11 and 12, wherein the end portions 24f of the tubular spacers 23f which secure together the plates 12f and 21f of the stator 11f are formed with circumferentially spaced apart, axially opening recesses or cutouts 25 (FIG. 11), and the material of each bearing support structure 13f is molded, pressed or struck by a suitable tool diagrammatically indicated at 18f so as to provide similarly spaced apart projections or tabs 26 (FIG. 12) which engage in the cutouts or recesses 25 at the end edges of tubular spacers 23f, thereby to prevent rotation and radial displacement of the bearing support structures or seats 13f relative to the stator 11f of the electric motor 10f. As in the previously described embodiments, the bearing support structures 13f may be formed with openings 20f aligned with the spacers 23f to receive the bolts 16f extending through the latter, and by which the bearing support structures are axially secured to the stator.

In view of the foregoing, it will now be understood in making the improved stationary unit of an electric motor described above, a stator core structure and bearing support structures at opposing ends of the unit are placed in juxtaposition to each other with each one of the bearing support structures distributed over a different lateral end face of the stator core structure and in the position it assumes when mounted on the stator core structure. Before the structures are placed in juxtaposition to each other, the stator structure at opposite ends thereof is provided with anchoring zones, such as the bores 17 in FIG. 2 or the open-ended tubular members 23 in FIGS. 8, for example, which extend axially of the unit.

While the bearing structures are in the aforementioned position with respect to the stator core structure, the bearing support structures are deformed at the vicinities of the anchoring zones to displace and move material of the bearing support structures which is integral therewith into interlocking relation with the anchoring zones, as shown in FIGS. 3 and 9, for example, to mount the bearing support structures on the stator core structure and prevent rotation and radial displacement of the bearing support structures with respect to the stator core structure when they are mounted thereon.

As shown in FIGS. 9, 10 and 12, each interlocking portion of one of the bearing support and stator core structures is independently anchored at a different one of the other interlocking portions of the bearing support and stator core structures and prevents relative movement therebetween in any direction in a plane normal to the axis of the motor shaft. Further, in FIGS. 9 and 10, each of the projections formed at the ends of the tubular members of the stator core structure is independently anchored completely about a peripheral surface thereof at a different one of the recesses formed in the bearing support structures and prevents relative movement therebetween in any direction in a plane normal to the axis of the motor shaft.

Although the stator of each of the embodiments illustrated in FIGS. 9, 10 and 12 includes end plates 21d, 21e or 21f at the opposite ends of the stack of laminations, it is apparent that such end plates may be eliminated, as in the embodiments of the invention previously described herein with reference to FIGS. 4 and 5.

Attention is called to applicant's copending application Serial No. 396,916, filed September 16, 1964, claiming subject matter herein disclosed.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

I claim:

1. In an electric motor having a stator body and a bearing support member at each end of the stator body for rotatably mounting a rotor shaft, the stator body having opposing end walls and comprising a stack of plates, the stator body having openings which extend axially between the opposing end walls thereof and are defined by aligned apertures in the plates, the combination of hollow tubular spacers extending through the openings and having axially extending end zones projecting beyond the end walls of the stator body, the end zones of the spacer tubes projecting beyond one end wall of the stator body including first and second axially extending sections, the first end zone sections having walls which flare outward from a first internal diameter immediately adjacent to the one end wall of the stator body to a second larger internal diameter at regions axially removed from the one end wall, the second end zone sections extending from the last-mentioned regions to the extreme ends of the spacer tubes and having walls substantially parallel to the axes of the openings, whereby the internal diameters of the second end zone sections are substantially uniform throughout their lengths and at the second larger internal diameter, the bearing support member at the one end wall of the stator body having an inner wall surface which faces the one end wall and is substantially parallel thereto and axially spaced therefrom, the last-mentioned bearing support member having studs which are distributed about the inner wall surface thereof and are integral therewith and extend axially therefrom, the second end zone sections of the spacer tubes defining cylindrical-shaped recesses, the recesses snugly receiving the studs, and the extreme ends of the second end zone sections of the spacer tubes having end surfaces which abut the inner wall surface of the bearing support member at regions disposed about the studs.

2. In an electric motor having a stator body and a bearing support member at each end of the stator body for rotatably mounting a rotor shaft, the stator body having opposing end walls and comprising a stack of plates, the stator body having openings which extend axially between the opposing end walls thereof and are defined by aligned apertures in the plates, the combination of hollow tubular spacers extending through the openings and having axially extending end zones projecting beyond the opposing end walls of the stator body, the end zones of the spacer tubes including first and second axially extending sections, the first end zone sections having walls which flare outward from a first internal diameter immediately adjacent to the end walls of the stator body to a second larger internal diameter at regions axially removed from the end walls to secure the plates together, the second end zone sections extending from the last-mentioned regions to the extreme ends of the spacer tubes and having walls substantially parallel to the axes of the openings, whereby the internal diameters of the second end zone sections are substantially uniform throughout their lengths and at the second larger internal diameter, the bearing support members at the opposing end walls of the stator body having inner wall surfaces which face the end walls and are substantially parallel thereto and axially spaced therefrom, the bearing support members having studs which are distributed about the inner wall surfaces thereof and are integral therewith and extend axially therefrom, the second end zone sections of the spacer tubes defining cylindrical-shaped recesses, the recesses snugly receiving the studs, and the extreme ends of the second end zone sections of the spacer tubes having end surfaces which abut the inner surfaces of the bearing support members at regions disposed about the studs.

References Cited by the Examiner
UNITED STATES PATENTS

| | | | |
|---|---|---|---|
| 2,479,330 | 8/49 | Fagley | 310—259 |
| 2,606,083 | 8/52 | Kitto et al. | 310—90 X |
| 2,696,568 | 12/54 | Jepson | 310—259 |
| 2,792,512 | 5/57 | Kock | 310—90 |
| 2,870,356 | 1/59 | Gibson | 310—258 |
| 2,871,384 | 1/59 | Gabriel | 310—90 X |
| 2,939,021 | 5/60 | Gilchrist | 310—258 |
| 3,050,832 | 8/62 | Scheldorf | 29—155.5 |
| 3,092,897 | 6/63 | Agner | 29—155.5 |

MILTON O. HIRSHFIELD, *Primary Examiner.*